Dec. 2, 1941.  G. J. BAIR  2,264,499
MANUFACTURE OF GLAZED CERAMIC BODIES
Filed Nov. 29, 1938  7 Sheets-Sheet 1

INVENTOR.
GEORGE J. BAIR
BY Bradley & Bee
ATTORNEYS.

Dec. 2, 1941.  G. J. BAIR  2,264,499
MANUFACTURE OF GLAZED CERAMIC BODIES
Filed Nov. 29, 1938  7 Sheets-Sheet 2

INVENTOR.
GEORGE J. BAIR
BY Bradley & Bee
ATTORNEYS.

Dec. 2, 1941.  G. J. BAIR  2,264,499
MANUFACTURE OF GLAZED CERAMIC BODIES
Filed Nov. 29, 1938  7 Sheets-Sheet 3

Fig. 4.

INVENTOR.
GEORGE J. BAIR
BY Bradley & Bee
ATTORNEYS.

Dec. 2, 1941.　　　　　G. J. BAIR　　　　　2,264,499
MANUFACTURE OF GLAZED CERAMIC BODIES
Filed Nov. 29, 1938　　　7 Sheets-Sheet 4

Fig. 6.

INVENTOR.
GEORGE J. BAIR
BY Bradley & Bee
ATTORNEYS.

Dec. 2, 1941.  G. J. BAIR  2,264,499
MANUFACTURE OF GLAZED CERAMIC BODIES
Filed Nov. 29, 1938  7 Sheets-Sheet 6

Fig. 8.

INVENTOR
GEORGE J. BAIR
BY Bradley & Bee
ATTORNEYS.

Dec. 2, 1941. G. J. BAIR 2,264,499
MANUFACTURE OF GLAZED CERAMIC BODIES
Filed Nov. 29, 1938 7 Sheets-Sheet 7

INVENTOR.
GEORGE J. BAIR
BY Bradley & Bee
ATTORNEYS.

Patented Dec. 2, 1941

2,264,499

UNITED STATES PATENT OFFICE 2,264,499

MANUFACTURE OF GLAZED CERAMIC BODIES

George J. Bair, Pittsburgh, Pa., assignor to Norbert S. Garbisch

Application November 29, 1938, Serial No. 242,944

2 Claims. (Cl. 49—1)

The present invention relates to apparatus for forming and glazing ceramic bodies and it has particular relation to such apparatus as is applicable to the formation of and glazing of tiles or similar bodies from waste sand produced in the grinding and polishing of glass.

One object of the invention is to provide an apparatus of the foregoing type which operates substantially continuously and requires a minimum number of heating operations in the formation of the completed product.

It has heretofore been the practice in the grinding and polishing of glass to cement the plates thereof to the top of movable cars or tables, and then to spread sand in water suspension over the surfaces to be polished while simultaneously passing them under revolving discs, termed runners. Gradually the surfaces were worn away and simultaneously the particles of sand were broken down into finer and finer state. Ultimately a very intimate mixture of extremely fine (about 5 to 20 microns) particles of silica and glass was obtained. This mixture contained about 10–25 per cent of glass, the rest being mainly silica. Because of its fine state of division and for other reasons the mixture has heretofore been discarded as of no value.

Recently it has been suggested that the mixture might be heated to the sintering point of the glass particles contained therein and then subjected to pressing in a suitable mold. As a result of this treatment the particles of silica and glass were bonded together to form strong coherent bodies suitable for use as ceramic tiles, or for similar purposes.

The bodies as initially obtained possess porous, or more or less grainy, surfaces somewhat resembling an ordinary unglazed tile which for most purposes requires a glaze. Conventional methods of glazing such as are employed in connection with ordinary clay tiles suggest themselves. However, it will be recognized that the steps of forming a clay tile involve preparing plastic blanks of moist clay and then drying and firing the blanks in saggars stacked in kilns. In order to glaze the blanks, they are cooled, annealed and coated with a slip of glazing material, subsequently they are reheated in order to fuse the glaze and finally they are annealed to relieve internal strain. The cooling and reheating operations of course are time-consuming and also necessitate the expenditure of excessive amounts of fuel.

It has now been found that by employing the waste sand from the grinding and polishing of glass as a source of material for ceramic bodies it can be hot pressed, in order to form the desired bodies and then immediately the glaze can be applied thereto in the form of a dry powder with but little cooling or reheating of the bodies. Subsequently the tiles to which the glaze has been applied can be passed through tunnel kilns in order to mature the glaze and then to anneal them.

For a better understanding of the invention reference may now be had to the accompanying drawings in which like numerals refer to like parts.

In the form of the invention shown in Figures 1–5 inclusive circular base 15 is formed with upwardly-extending ribs 16 constituting tracks for flanged rollers 17. The rollers also receive and support downwardly-extending ribs 18 of an annular conveyor ring 19 that supports a series of molds 20. These molds are formed with cavities 21 of appropriate size and contour in which are disposed follower plates 22, designed to extract the blanks after formation. Each plate is attached to a vertical rod 23 extending downwardly through the mold and having upon its lower extremity a roller 24 which engages at an appropriate stage in the travel of the ring 19, with a cam 25 to raise the plate.

Rotary motion is imparted to the ring by means of a piston 25' (shown in Fig. 1) reciprocating in a cylinder 26, having inlets 27 and 28 for fluid under compression. As will be observed, the axis of the piston extends approximately tangentially with respect to the periphery of the ring 19 and at its extremity is provided with a pivoted pawl 29, adapted to engage gear teeth 31 upon the outer periphery of the ring in such manner that upon reciprocation of the rod, the ring is rotated in steps corresponding in linear length to the spacing of the molds.

Waste send for forming the tile blanks may be supplied to the molds from a feed mechanism such as a chute 32 extending to a suitable feed hopper (not shown). The sand may be fed into the molds in loose state or, if preferred, it may be admixed with a binder such as molasses, tar, water-glass, or the like, to form plastic masses which may be subdivided into tablets or briquettes of appropriate size for the preparation of the bodies.

A tunnel kiln 33 having a charging end and a discharging end incloses an appropriate sector of the ring 19 and is provided with suitable burners (not shown) by means of which the waste sand material contained in the molds may be heated to the sintering temperature of the glass content of the waste sand mixture.

A press for shaping and consolidating the waste sand into coherent masses in the molds disposed adjacent to the discharging end of the kiln comprises a base 36, to the upper portion of which is attached a vertically disposed cylinder 37 having conduits 38. A plunger 39 reciprocates within the cylinder and is adapted to register with molds 20 and when the plunger is actuated downwardly it functions to compress material within the mold disposed therebeneath.

The blanks 41 are removed from the follower plate 22 by means of a mechanism which includes a piston 42 reciprocating in a cylinder 43 which conveniently may be disposed in the base 36 of the press and which is supplied with actuating fluid for the piston by conduits 44.

A plate 47 receives the freshly formed blanks and directs them upon the upper reach of a conveyor belt 48, having its receiving end adjacent to the press, and trained about rollers 49, one of which is driven by motor mechanism 50. Preferably the conveyor is formed of heat-resistant material, for example, of a mesh of chromium steel links. The upper reach of the belt upon which the freshly formed blanks are disposed passes through a preheating tunnel 51 within which is disposed a series of burners 52 for heating the blanks to an appropriate temperature for glazing.

Figure 1:
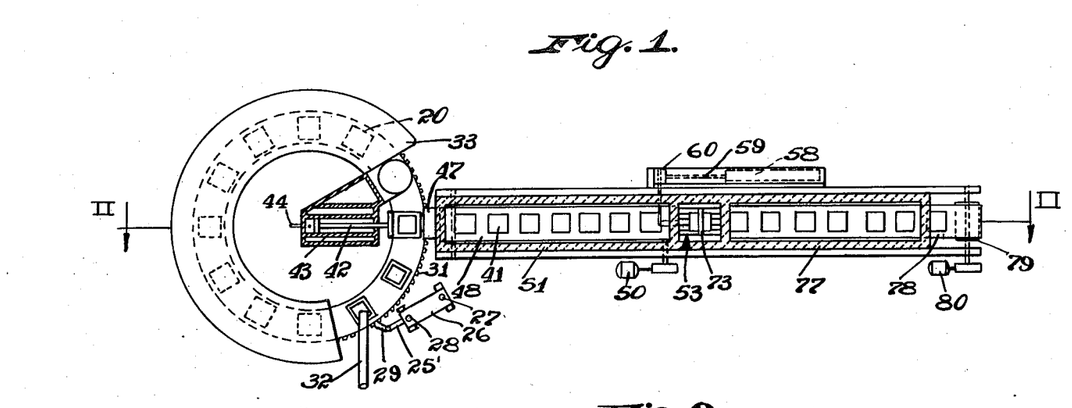
Figure 1 is a sectional view taken in a horizontal plane along the lines I—I of Fig. 2, of an apparatus embodying the process of the invention.
Figure 2:
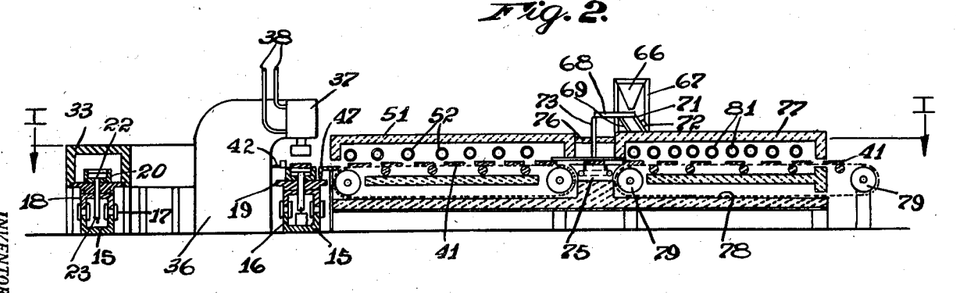
Figure 2 is a view partially in elevation and partially in cross-section, taken substantially upon the line II—II of Fig. 1.
Figure 3:
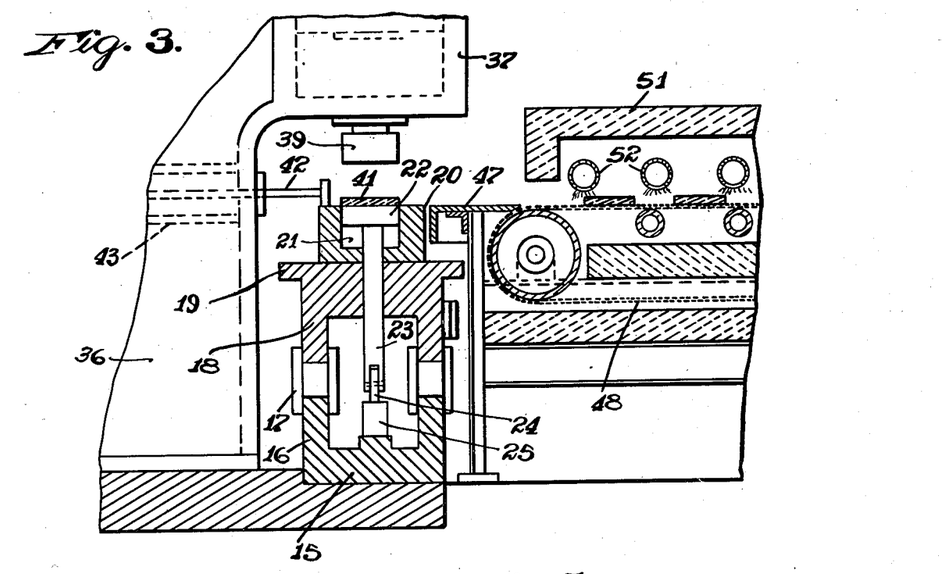
Figure 3 is a fragmentary view partially in elevation and partially in cross-section of a molding and pressing mechanism suitable for use in forming coherent blanks from waste sand.
Figure 4:
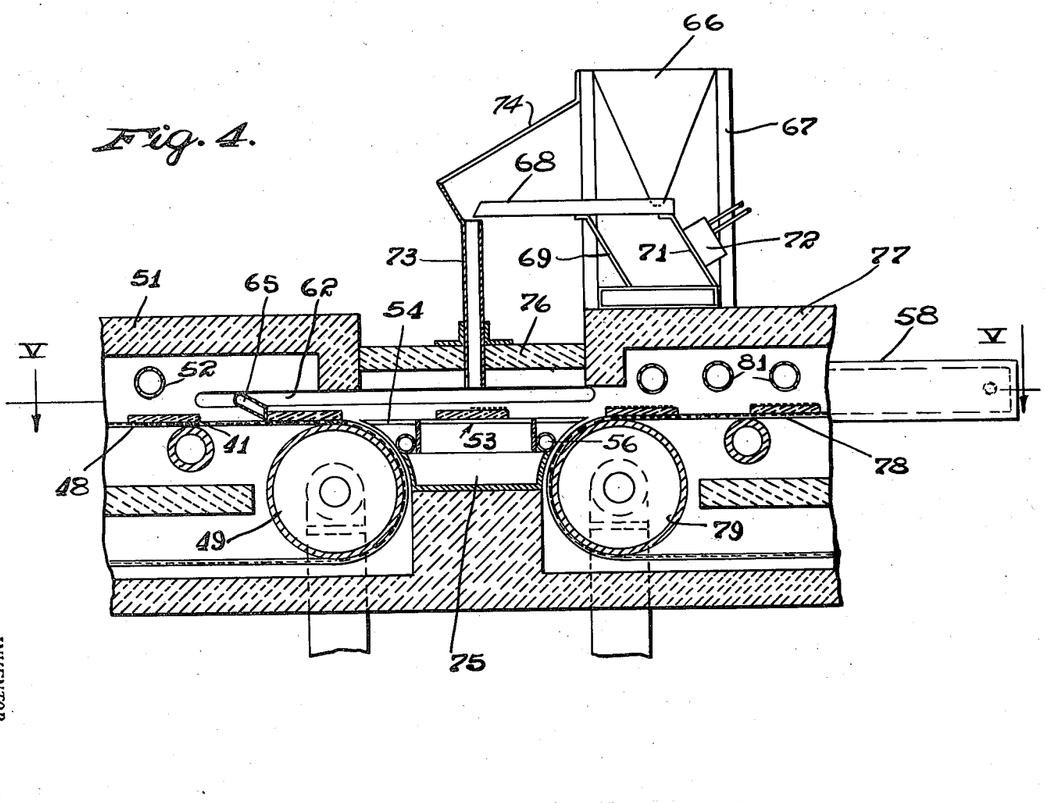
Figure 4 is a fragmentary cross-sectional view taken in vertical plane, showing in greater detail mechanism for applying pulverized glazing material to the tile blanks.
Figure 5:
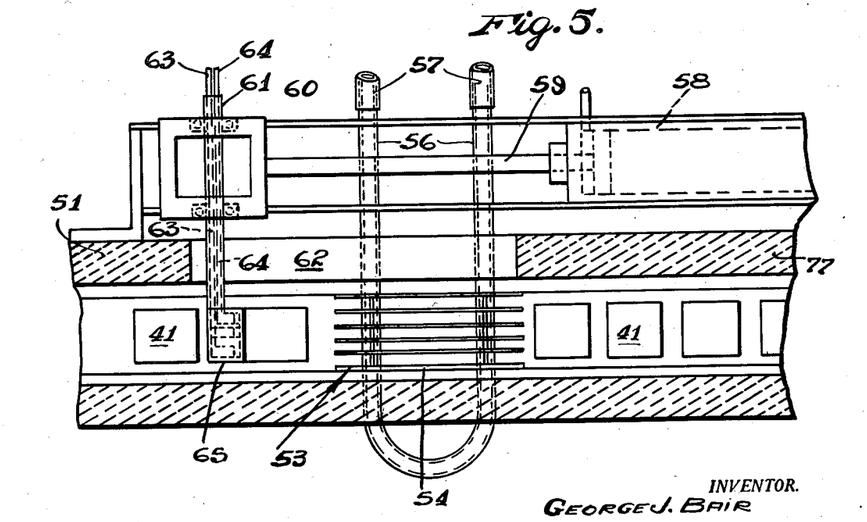
Figure 5 is a fragmentary cross-sectional view taken in a horizontal plane substantially upon the line V—V of Fig. 4.

As shown in Figs. 4 and 5 mechanism for receiving the preheated blanks from the conveyor belt 48 includes a grid or platform 53 comprising a series of spaced parallel bars 54 disposed adjacent to the extremity of kiln 51. Preferably the bars are water cooled, for example by means of a conduit 56 contacting therewith and connected at its extremities with supply conduits 57, for the admission and withdrawal of cooling fluid.

A cylinder 58 for fluid under compression is disposed in parallelism with respect to the preheating kiln 51 and a piston 59 reciprocates therein. This piston at its forward extremity is provided with a cross-head 60, through which extends an arm 61 that projects laterally through slot 62 into the kiln at the extremity thereof. The arm may be of hollow construction and include an inlet conduit 63, for the admission of cooling fluid and an outlet 64. Arm 61 includes a downwardly-extending finger 65 which, as the piston 59 advances, rides up and over the top of the tile blanks, but as the piston is retracted it engages the rear edges of the blanks to carry them forward upon the platform 53.

As the blanks traverse the platform, dry, pulverized, glazing material is distributed thereupon by means of a mechanism that includes a supply hopper 66 carried by a framework 67. At its lower extremity the hopper discharges into a feed chute 68, which is supported upon parallel spring leaves 69 and 71, the latter of which carries vibrator 72 for imparting a rapid vibratory motion thereto. Such motion carries the crushed material along the chute and discharges it into a vertical chute 73, carried by arm 74 from frame 67. At its lower extremity chute 73 terminates adjacent to the upper surface of a blank upon the platform. A receptacle 75 is disposed beneath the platform to receive any material which is not deposited upon the surface of the tile and which drops between the bars of the platform.

A cover plate 76, through which chute 73 extends, is supported between kiln 51 and a second kiln 77 constitutes means to conserve heat within the blanks while the glaze is being applied. In order to insure adequate fusing or sintering of the glazing material upon the tile blanks the latter are pushed from platform 53 upon a second conveyor 78 corresponding to conveyor 48. This conveyor is disposed upon drums 79 which are driven approximately in synchronism with the drums 49 by motor mechanism 80. This conveyor extends through tunnel kiln 77 above mentioned and burners 81 within the kiln at the rear extremity thereof play upon the tile blanks, thus insuring adequate fusion of the glazing material. The burners 81 are so regulated as to obtain gradually decreasing temperature in the direction of travel of the glazed bodies. Proper annealing is thus obtained.

The mode of operation of the construction described is substantially as follows:

When the mold carrying ring 19 is at rest, the molds 20 are charged through the chute 32 with waste sand in appropriate amount to form the tiles or other blanks which are to be produced. The sand may be cold or if preferred it may be preheated to any appropriate degree, e. g. 1000° F., in order to reduce the amount of heat necessary to be added in the furnace 33, in order to sinter the glass particles. As previously stated, the waste sand may also be added in the form of coherent tablets or briquettes obtainable by mixing the material in dry state with a binder such as water-glass and then subdividing it into masses of appropriate size and dried. If tablets or briquettes are fed into the molds, they may be preliminarily coated with lime or other dusting material, in order to prevent possibility of adhesion to the molds.

The molds are successively indexed past the charging station by reciprocation of the piston rod 25' in the cylinder 26 until the one first charged reaches the press 36. During passage through the kiln 33 the material is heated to about 16 or 17 hundred degrees F. The mold on emergence from the kiln is brought into register with the plunger 39 and fluid is admitted to the cylinder 37 in order to actuate the plunger downwardly to compress the material. The degree of pressure employed to effect satisfactory consolidation of the mass preferably is relatively high. Good results have been obtained by employment of a pressure of about 4000 to 6000 pounds per sq. inch of surface area of the blank under compression. Higher pressures may be employed and the upper limit is determined only by the capacity of the apparatus. Pressures as low as 1000 pounds per sq. inch or thereabouts are also contemplated. The period of application of the pressure may be relatively short, for example, 1-10 seconds, though shorter or longer periods are also applicable if so desired. A brief hammer-like impact upon the material is also contemplated as being within the scope of the invention.

After a block has been properly compressed the plunger is withdrawn and the mold is indexed to bring the next mold into register with the press. The rotation of the ring 21 engages the roller 24 with the cam 25 to lift rod 23 and the follower plate 22, thus elevating the freshly formed coherent blank to the level of the top of the mold.

Piston rod 42 is then actuated to push the freshly formed blank from the mold across the plate 47 to the upper reach of the conveyor belt 48. The latter carries the blanks in succession under the burners 52 to preheat them to the desired temperature for glazing. When a blank reaches the end of the preheating tunnel 51, fluid under compression is admitted to the cylinder 58 to actuate the piston rod 59 forwardly and the finger 65 then drops over the front edge of a preheated blank. When fluid under compression is admitted to the other end of the cylinder to retract the piston rod, the blank is drawn from the belt upon the platform 53 and moves under the lower end of the chute 73. Glazing material in pulverized form is fed downwardly through the chute and sprinkled over the surface of the blank in a relatively uniform layer. It is probable that a certain degree of sintering of the glazing material occurs immediately upon contact with the blank. However, in order to insure perfect sintering the blank is pushed by the plunger from the platform upon conveyor 78 which then conducts it under burners 81. After the glazing material has been properly fused or sintered the blanks pass through the cooler zones of the chamber 77 where the temperature is gradually reduced in order to anneal the bodies. Subsequently the bodies are removed from the forward end of the kiln.

The chilling of the grid or platform 53 by glazing conduit 56 obviates any tendency of any material striking it to fuse thereto. The material simply falls through into pan 75 where it can be removed.

In the form of the invention illustrated in Figures 6-10 inclusive the press 90 for forming the blanks is provided with a base 91 having a platen 92 upon which rests a mold 94, having a cavity 96 of appropriate dimensions for the articles to be formed. Cavities 97 are also formed in the mold and suitable burners of heating elements 98 are disposed therein for purposes of maintaining the mold at a suitable working temperature.

Blanks after they have been pressed in the mold are ejected by means of a follower plate 99 upon a piston rod 101 which projects upwardly through the mold. The rod at its lower extremity is attached to a piston head 102 within a cylindrical cavity 103, which cavity is supplied with fluid under compression by means of conduits 104.

Pressure is applied to the material within the mold by plunger 106 upon the lower extremity of a piston rod 107 which reciprocates within vertical cylinder 108 upon the upper extremity of the base 91. At opposite extremities this cylinder is connected with conduits 109 and 111 for the admission of actuating fluid.

Figure 6:
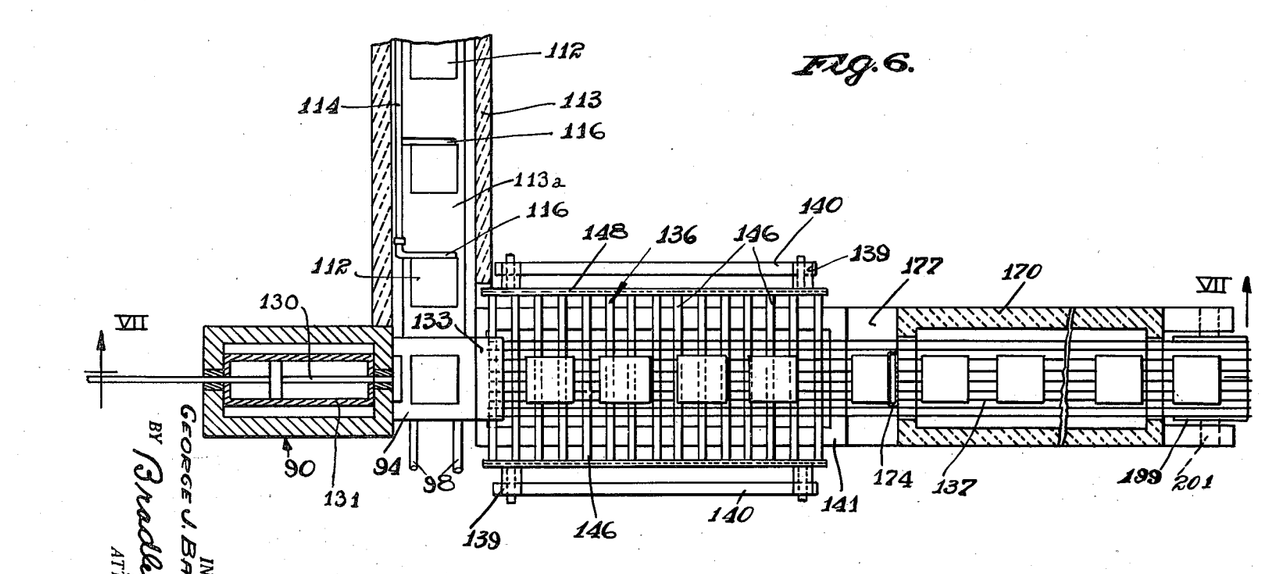
Figure 6 is a cross-sectional view taken in a horizontal plane substantially along the line VI—VI of Fig. 7, showing a modified form of apparatus.
Figure 7:
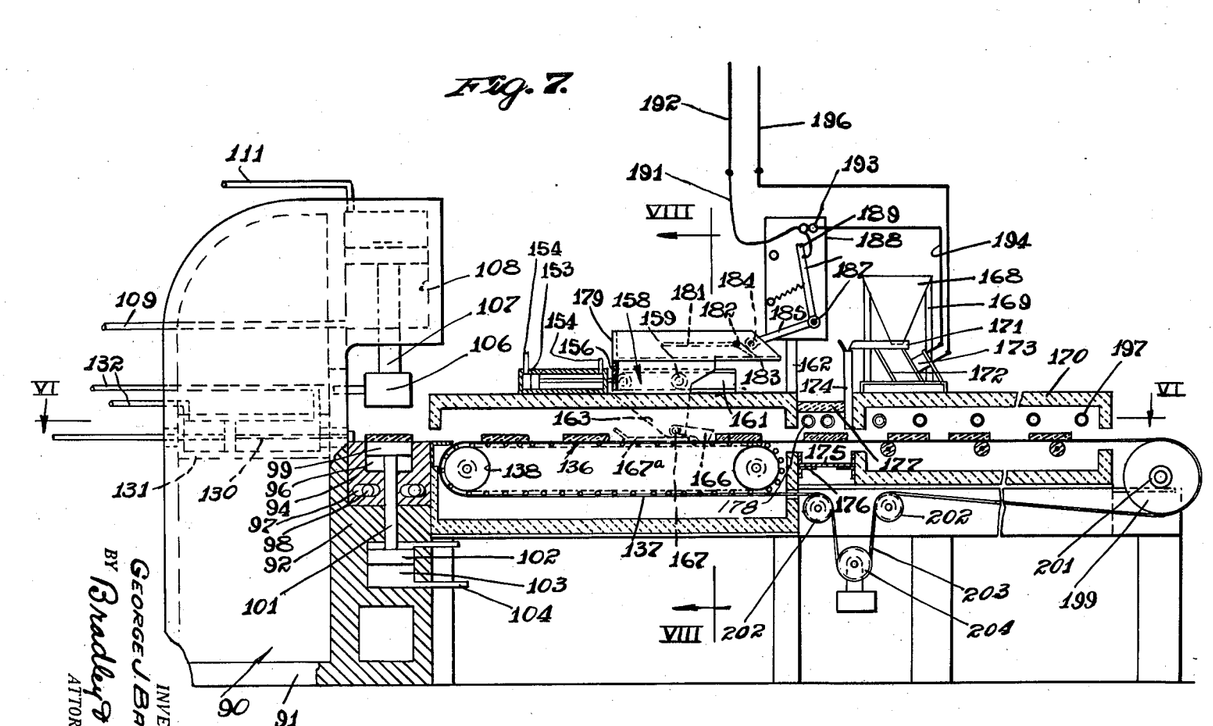
Figure 7 is a view partially in elevation and partially in cross-section, substantially upon the line VII—VII of Fig. 6.
Figure 9:
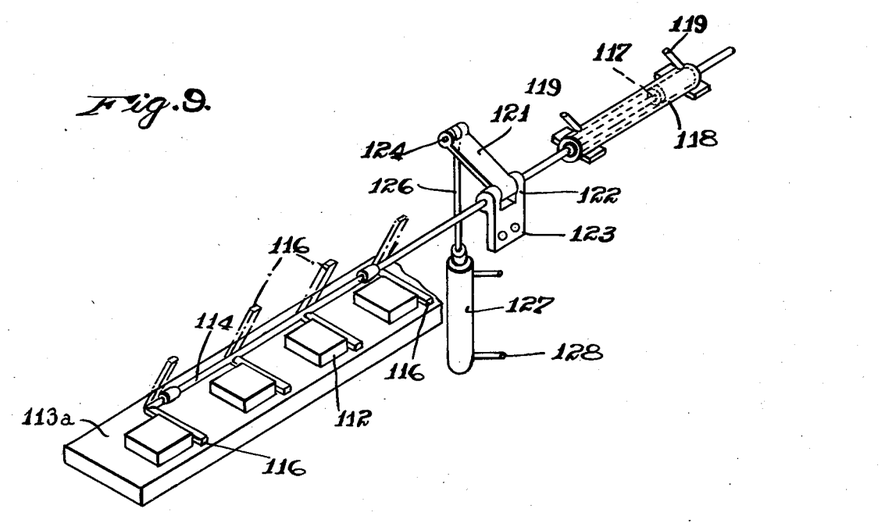
Figure 9 is a fragmentary isometric view of a mechanism for pushing tablets or briquettes of waste sand into the forming press.

Preheated material (waste sand) may be supplied to the press, for example in the form of tablets or briquettes 112 of approximately the same cross-section as the mold cavity 96. If they are not of a size sufficient almost completely to fill the mold, difficulty may be experienced in the pressing operation, because the material will not flow laterally to any substantial degree. The tablets are supported upon slab 113a and are passed through a preheating tunnel kiln 113, which is provided with burners (not shown), by mechanism including a rod 114 having combined reciprocal and rotative movement within the kiln. The rod as shown in Figures 6 and 9 has appropriately spaced laterally-extending fingers 116 adapted to engage the rear edges of the tablets and thus to move them in steps through the kiln.

Reciprocatory motion is transmitted to the rod by means of a piston 117 upon the rear extremity thereof, which piston reciprocates within a cylinder 118, having conduits 119 at opposite extremities thereof for the admission of actuating fluid. The stroke of the piston corresponds to the spacing of the fingers 116, thus insuring that after a briquette has been advanced by one finger it will be engaged by the succeeding finger during the next stroke.

Rotation of the rod for purposes of alternately lowering the fingers 116 to engage the rear edges of the briquettes 112 during forward movement thereof, or to clear the edges during retraction of the rod is effected by an arm 121, which is splined upon the shaft, within a bifurcated portion 122 of a bearing bracket 123. The extremity of the arm is pivoted as indicated at 124 to a piston rod 126 which reciprocates in cylinder 127 having conduit connections 128 for fluid under compression.

The freshly formed blanks are removed from the follower plate 99 by means of a piston rod 130 which reciprocates in cylinder 131 having conduits 132 for fluid under compression.

Blanks pass from the follower plate across an apron 133 to a belt 136, which is encircled by a system of parallel, spaced wires 137. The wires and the conveyor will be described in greater detail in due course.

Figure 8:
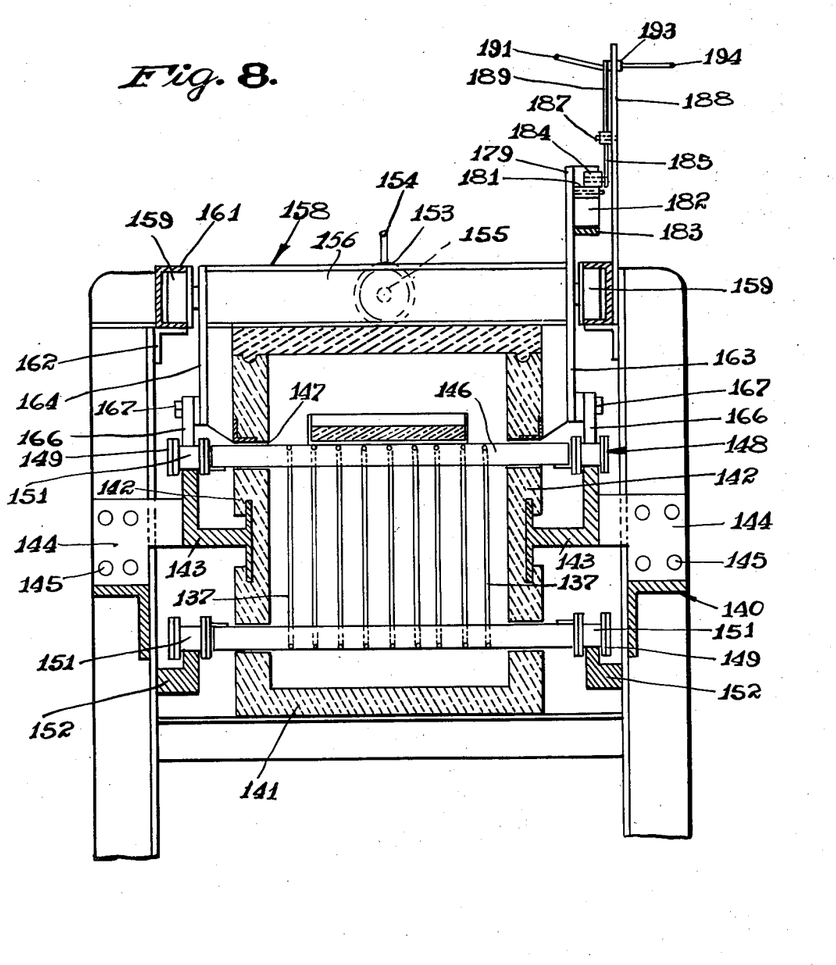
Figure 8 is a cross-sectional view substantially upon the line VIII—VIII of Fig. 7.

Conveyor belt 136 and forward portions of wires 137 are trained about rollers 138 having bearings 139 supported by framework 140, of tunnel kiln 141, adapted to reheat the freshly formed blanks for the subsequent enameling or glazing operation. As shown in Fig. 8, the space between the reaches of the conveyor belt is closed by means of sections 142 which are supported by channel-like rails 143, that rest on brackets 144, which in turn are attached to frame 140 by bolts 145.

As shown in Figure 8, conveyor 136 comprises transverse bars 146 with slots for wires 137. At their extremities, the bars extend through slots 147 between the edges of closures 142 and the adjacent edges of the walls of the kiln and are interconnected by a drive-chain 148, including links 149 and rollers 151. The rollers of the upper reach of the chain ride upon the upper edges of rails 143, and those of the lower reach ride upon the upper edge of a rail 152 of L-shape cross section, which at its extremities is secured to the frame 140.

For purposes of actuating the chain intermittently to drive the conveyor, a cylinder 153, having conduits 154 for actuating fluid, is secured upon the kiln and is provided with a piston rod 155. At its extremity, the piston rod is attached to a cross-bar 156 of a carriage 158. Wheels or rollers 159 are secured to the sides of the carriage and are disposed in channel-like members 161 mounted upon rails 162, of frame 140.

Side plates 163 and 164 are also secured to the sides of the carriage 158 and terminate at their lower edges adjacent to the conveyor chains 148. Pawls 166 pivoted as indicated at 167 to the plates 163 and 164 provide a connection between the plates and the links of the chains. Longitudinally adjustable plates 167a may be disposed above the chains in position to lift the pawls from the chains during a part of the stroke of piston 154. By adjustment of these plates the length of the effective stroke of the pawls may be regulated.

It will be observed that wires 137 extend through kiln 141 and pass through mechanism for glazing the tiles. The mechanism includes a feed hopper 168, supported by uprights 169 upon a second section 170 of kiln 141. The hopper discharges into a feed trough 171 which is supported upon leaf springs 172, one of which is provided with an electrical vibrator 173. The feed trough discharges into a vertical chute 174, which at its lower extremity projects into proximity to bodies upon wires 137. Material not caught by the tiles upon the wires 137 drops into a pan 175, which is supported upon ledges 176 between kiln sections 141 and 170.

The temperature of the bodies is maintained during the glazing operation by a cover plate 177 through which chute 174 extends. If desired, burners 178 may also be disposed in proximity to the discharge end of the chute.

The operation of the feed trough 171 is synchronized with the movements of the conveyor 136 and wires 137 by suitable control mechanism involving an upwardly-projecting extension 179 of plate 163, which extension carries a horizontal flange or rib 181, having at its forward end a pawl 182, which at its free end normally rests upon a second horizontal flange 183. A roller 184 at the extremity of the switch arm 185 travels upon the flanges as the carriage 158 oscillates, being deflected by pawl 182 to pass over the flange 181 during forward movement of the carriage. During the return stroke it drops down upon flange 183.

The switch arm is pivoted as indicated at 187 to plate 188 which is mounted upon bar or beam 162. An arm 189 is, also, secured to the switch arm and at its upper end is provided with a flexible connection 191 joined to electrical conductor 192. The extremity of the arm is provided with a contact point 193 having lead 194 to vibrator 173. The latter is further connected by lead 196 to a suitable source of electrical current in order to energize the vibrator.

The wires 137 extend through section 170 of the furnace and pass in proximity to a series of burners 197 adapted to heat the tiles to such temperature as completely to fuse down the glaze into a smooth uniform coating. The burners 97 may be so regulated as to obtain gradually decreasing temperatures in the direction of travel of the glazed bodies, thus insuring that the latter will be properly annealed. Externally of the end of the section 170, the wires 137 are trained about a roller 199 journaled in bearings 201, disposed upon frame 140.

The return reach of the wires is also trained over a pair of horizontally spaced idler rollers 202, journaled in the supporting framework, of the kiln. Between the idler rollers loops 203 of the wire are trained about take-up rollers 204, which are designed to maintain the wires under uniform tension at all times.

Figure 10:
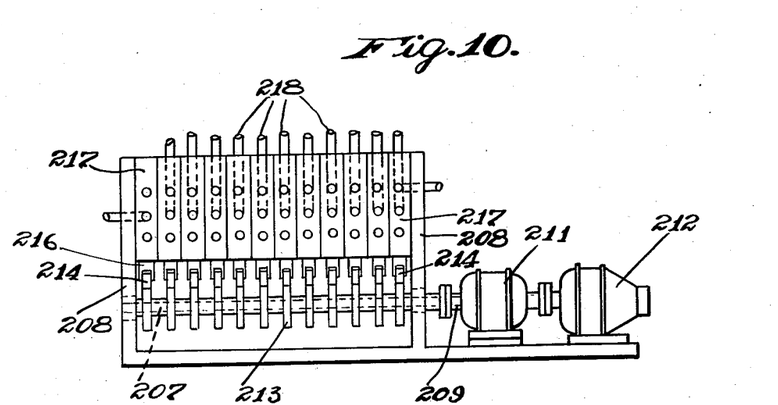
Figure 10 is an elevational detailed view of a cam mechanism for controlling the various operations of the apparatus.

As shown in Figure 10, mechanism for controlling the cycle of operation of the various elements of the assembly, including the cylinder 118, pressure cylinder 108, cylinder 103, cylinder 127, cylinder 131 and cylinder 153, includes a shaft 207, which is journaled at its extremities in uprights 208. The shaft at one extremity is connected to the shaft 209 of a speed-reducing mechanism or gearing 211, which in turn is driven by a suitable electrical motor 212.

Cams 213 of appropriate outline are disposed upon the shaft, there being a cam for each conduit of the pressure cylinders herein described. The cams contact with rollers 214 having bearings in the lower extremities of slides 216 of valves 217, which valves in turn are suitably connected by conduits 218 to the conduits of the various pressure cylinders. It will be apparent that as the shaft 207 is rotated the various valves are operated in sequence by the cams 213, in order to obtain the desired cycle of operations of the various elements in the mechanism.

The mode of operation on the mechanism is substantially as follows: Briquettes of waste sand are fed into the tunnel preheating kiln 113 in any convenient manner and are advanced in steps through the latter by means of the rod 114 and the side arms 116 carried thereby. At the time the briquettes reach the mold 94 it is desirable that the follower plate 99 be in elevated position and the piston or plunger 130 be retracted. The briquette is then advanced upon the follower which is subsequently retracted by rod 101 to lower the briquette into position in the mold.

The plunger 107, upon actuation, compresses the briquette into a dense strong coherent mass which upon admission of fluid to the cylinder 103 is elevated by the follower plate to the level of the top of the mold. Actuation of plunger 130 pushes the freshly formed body upon the conveyor 136 and wires 137 where it is carried under the preheating burners in order to raise it to the glazing temperature. As each body is deposited upon the conveyor the piston rod 155 is oscillated in order to advance the conveyor an appropriate step. When the blanks reach the extremity of the kiln 141, they are carried by wires 137 under the chute 174 during the cycle of operation of the vibrator 173. As a result a uniform layer of pulverized glazing material is deposited upon the upper surface of the blank. By reason of their small size, the wires after they emerge from the furnace quickly cool to such extent that stray glazing material striking them falls into the pan below without fusing to them.

In successive steps of operation of the conveyor the blanks having the pulverized material thereupon pass under burners 197, the heat of which fuses the material down to a uniform coating. In the further advance of the bodies they are carried into the cooler zones of the section 170 where they are gradually cooled in order to anneal them. The bodies upon emergence upon the section 170 are in finished form and may be removed for storage or packing.

It will be apparent that the process as herein disclosed is peculiarly adapted for the production of tiles or similar bodies from waste sand or such like materials comprising a hard, infusible but pulverulent material admixed with a fusible material such as glass. Such material may be preheated to the temperature required for pressing. Then when still hot it can be removed immediately from the press as a body of sufficient rigidity to admit of handling and glazing. At most, slight reheating to bring it to the glazing temperature is all that is required. Accordingly, it is feasible to apply dry pulverized glaze to the bodies as they are received from the press and then by a short heating operation adequately to fuse down the glaze into a uniform coating.

This in direct contrast to conventional processes of forming ceramic bodies from clay in which the bodies are first formed from moist material and must then be dried, fired and cooled before glazing material can be applied. Such process almost of necessity requires prolonged firing operations with the bodies in saggers or trays.

Various glazes are applicable in the process. However, one that will fuse down at a temperature below about 1700° F. is to be preferred. Enamels such as are applicable to cast iron are particularly adapted for the purpose. The following is an example of such enamel:

| | |
|---|---|
| Silica | 32.0 |
| Salt peter | 6.0 |
| Soda ash | 7.5 |
| Borax | 9.5 |
| Red lead | 39.5 |
| Coloring ($Fe_2O_3$ or the like) | 5.5 |

It will be apparent that in the use of the apparatus herein disclosed, the blanks as received from the press may still retain sufficient heat adequately to sinter down the glazing material upon contact therewith, without preheating. Accordingly, the use of preheating kilns may be obviated, and application of pulverized glaze may be made immediately upon removal of the bodies from the press.

If the body is sufficiently hot, by reason of residual heat from the pressing operation or by reason of subsequent reheating, the glaze may be applied and fused down sufficiently for immediate annealing. The further application of heat after application of the glaze may then be obviated.

The present application is a continuation in part of applicant's co-pending application Serial No. 224,308, filed August 11, 1938.

What I claim is:

1. Apparatus for forming glazed ceramic bodies from a mixture of sand and glass in finely-divided form resulting from the grinding and polishing of glass plates, said apparatus comprising a preheating furnace having a charging end and a discharging end, for heating the mixture to a temperature above that of sintering of the glass content, a press disposed adjacent to the discharging end of the preheating furnace for compacting and forming the material into bodies of a desired shape, means to move the mixture in small portions while hot from the preheating furnace to the press, a conveyor having a loading end and an unloading end, the first-mentioned end being adjacent to the press to carry the freshly-formed bodies from the press, means to transfer the said bodies from the press to the loading end of the conveyor, a reheating furnace enclosing the conveyor, a grid-work at the unloading end of the conveyor, means for withdrawing bodies from the conveyor and depositing them upon the grid-work, and means to feed glazing material upon the bodies while they are on the grid-work.

2. Apparatus as defined in claim 1 in which the means for applying glazing material includes a vibratory feed element designed to sprinkle glazing material in dry pulverized condition upon the bodies as they pass therebelow.

GEORGE J. BAIR.